Feb. 8, 1966 G. R. DICKINSON ETAL 3,234,490

UHF-VHF TUNER MECHANISM WITH SINGLE KNOB CONTROL

Filed Oct. 1, 1962 5 Sheets-Sheet 1

INVENTORS
George R. Dickinson
Eugene J. Polley
By Cornelius J. O'Connor
Atty.

INVENTORS
George R. Dickinson
Eugene J. Polley
By Cornelius J. O'Connor
Atty.

UHF-VHF TUNER MECHANISM WITH SINGLE KNOB CONTROL

Filed Oct. 1, 1962 5 Sheets-Sheet 3

INVENTORS
George R. Dickinson
Eugene J. Polley
By Cornelius J. O'Connor
Atty.

INVENTORS
George R. Dickinson
Eugene J. Polley
By Cornelius J. Connor
Atty.

Feb. 8, 1966 G. R. DICKINSON ETAL 3,234,490

UHF-VHF TUNER MECHANISM WITH SINGLE KNOB CONTROL

Filed Oct. 1, 1962 5 Sheets-Sheet 5

INVENTORS
George R. Dickinson
Eugene J. Polley
By Cornelius J. [signature]
Atty.

3,234,490

UHF-VHF TUNER MECHANISM WITH SINGLE KNOB CONTROL

George R. Dickinson, Norridge, and Eugene J. Polley, Lombard, Ill., assignors to Zenith Radio Corporation, Chicago, Ill., a corporation of Delaware
Filed Oct. 1, 1962, Ser. No. 227,376
15 Claims. (Cl. 334—2)

This invention relates in general to tuner mechanisms and in particular to a combination VHF-UHF tuner for a television receiver.

Initially, television broadcasting was relegated to twelve channels (channels 2–13) in portions of the VHF spectrum extending from approximately 54 megacycles to 216 megacycles. Subsequently, seventy additional channels (channels 14–83) were authorized in that portion of the UHF spectrum extending from 470 megacycles to 890 megacycles. However, the majority of television stations transmit on VHF channels and it has become common practice to provide television receivers with a step-by-step type of tuner, such as a turret or bandswitch, which has one operating position for each of the VHF channels but none for UHF channels.

For those areas serviced by UHF as well as, or instead of, VHF stations, the receiver is further provided with a continuously tunable UHF tuner capable of selecting any of the UHF channels since a seventy position step-type tuner is obviously impractical. Alternatively, and particularly in situations where pre-set frequency selection is desired or mandatory, the receiver is furnished with a turret tuner having replaceable tuning strips. Certain of the strips are adjustably tuned to VHF channels and, if UHF channels are available in the receiver location, others are adjustably tuned to the appropriate UHF channels. Such a VHF/UHF tuning arrangement has proved to be very popular because it lends to great customer convenience since, with it, remote control is easily attained for television channels in either the VHF or UHF band.

In an effort to relieve VHF spectrum crowding, as well as to stimulate growth of the television broadcasting industry, Congress recently enacted legislation empowering the Federal Communications Commission to require manufacturers to equip television receivers with a tuner capable of receiving all the UHF stations. Insofar as compliance with such a directive is concerned, no particular difficulties, short of economic, are foreseen since continuously tunable devices capable of accommodating all UHF channels are well known and available.

However, such prior art UHF tuners do not readily lend themselves to pre-set tuning in which the tuner may be selectively positioned to a discrete frequency in response, for example, to remote control. One principal shortcoming of such prior devices is the want of acceptable repeat accuracy. Repeat accuracy is best defined as the ability of the tuner, once it has been initially phased or set-up, to repeatedly condition the receiver for optimum reception at each operative position without recourse to retuning.

Of course, the turret type tuner has very acceptable repeat accuracy but an 82-position turret accommodating twelve VHF and seventy UHF channels is impractical. In order to use a turret having less positions and yet satisfying requirements for tuning in all of the UHF channels, it is necessary to arrange that at least one of the UHF strips be tunable over the entire band and that, too, is a formidable design specification.

It is therefore an object of the invention to provide a television tuner mechanism capable of achieving discrete channel selection in any portion of the VHF-UHF spectrum.

It is another object of the invention to provide a VHF-UHF tuner mechanism which lends itself to manual or remote control in the selection of any channel in the VHF or UHF bands.

It is a further object of the invention to provide an improved universal tuner mechanism which overcomes shortcomings of prior art VHF-UHF tuner arrangements.

A tuner mechanism for a television receiver constructed in accordance with one aspect of the invention comprises a VHF tuner have a series of detented operating positions in each of which the receiver is conditioned for operation at a predetermined channel in the VHF band. The tuner mechanism also includes an UHF tuner comprising a stator assembly, a displaceable carriage, carriage indexing means and a plurality of adjustable frequency selectors which are supported upon the carriage for alternative presentation to the stator assembly upon arrest of the carriage by the indexing means. Each of the adjustable frequency selectors is individually, independently and semi-permanently tunable to select any of the channels in the UHF band. Each of these frequency selectors is independent of the other selectors so as to constitute, upon presentation to the stator assembly, a detented operating position in which the receiver is conditioned for operation at a desired UHF channel. Moreover, the number of UHF operating positions is independent of the number of VHF operating positions. The tuner mechanism further includes a programming mechanism having a series of indexing positions including one for each of the operating positions of both the VHF and UHF tuners. Finally, drive means are provided for actuating the programming mechanism in discrete steps throughout its indexing positions and for actuating the VHF and UHF tuners through their operating positions to maintain a given relation between the instantaneous position of the programming mechanism and the detented operating position of the VHF and UHF tuners corresponding thereto so that, upon actuation of the programming mechanism, successive VHF and selected UHF channels are tuned, seriatim, at successive ones at the indexing positions.

The features of the present invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2:
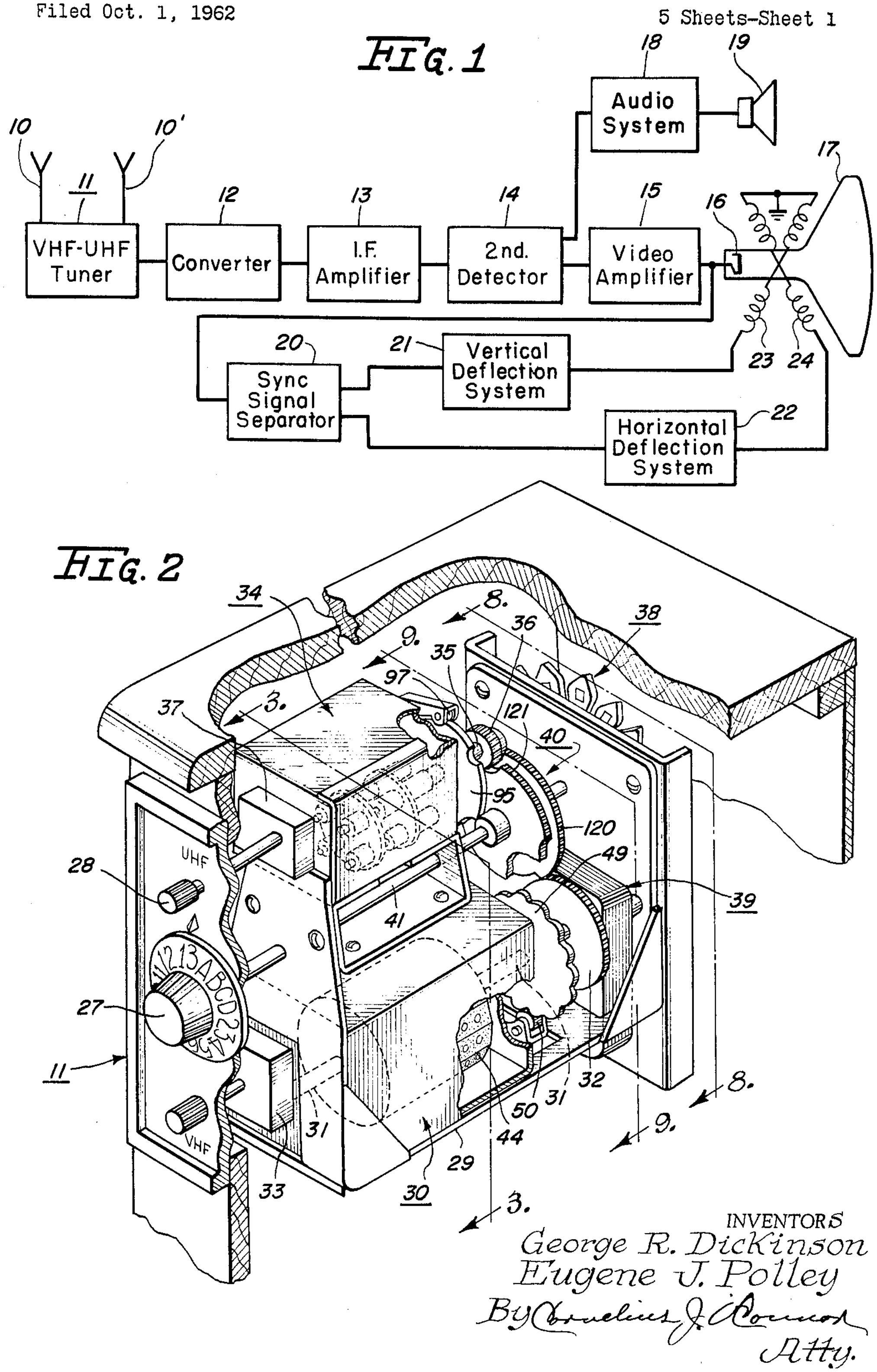
FIGURE 1 is a schematic representation of a television receiver for which the present invention is especially suited.
FIGURE 2 is a perspective view of a particular embodiment of a VHF-UHF tuner mechanism exemplifying the invention.

The television receiver of FIGURE 1 comprises VHF and UHF antennas 10, 10' which are coupled to a VHF-UHF tuner mechanism 11, the details of which are more completely described below. Cascade-coupled to the output of tuner 11, and in the order named, are a converter or heterodyning stage 12, an intermediate-frequency amplifier 13, a second detector 14 and a video amplifier 15. The output of video amplifier 15 is coupled to the cathode 16 of an image reproducing device 17. Detector 14 is provided with a second output terminal which is connected through an audio system 18 to a loudspeaker 19.

The output of video amplifier 15 is also coupled to the input of a synchronizing signal separator 20 which, in turn, is coupled to a vertical deflection system 21 and a horizontal deflection system 22. A pair of vertical deflection coils 23 are coupled between the output of vertical deflection system 21 and a point of reference potential while a pair of horizontal deflection coils 24 are coupled between the output of deflection system 22 and reference potential.

With the exception of the novel tuner mechanism 11, the television receiver shown in FIGURE 1 embodies circuitry which is well known and understood in the art; accordingly, only a brief description thereof is deemed necessary.

In operation, tuner 11 selects and amplifies a desired television signal intercepted by antenna 10 or 10'. After conversion to an intermediate-frequency signal by converter 12, the signal is amplified in stage 13 and then applied to second detector 14. In accordance with known intercarrier sound techniques, detector 14 furnishes a sound signal to audio system 18 wherein it is demodulated, amplified and then utilized to drive loudspeaker 19.

The video information in the output of detector 14 is amplified by video amplifier 15 and applied to cathode 16 of image reproducer 17 to provide intensity modulation of the cathode ray beam.

The output of video amplifier 15 is also applied to the input of sync separator 20 which serves to extract vertical and horizontal sync pulses from the received composite video signal. These vertical and horizontal sync pulses are applied to vertical deflection system 21 and horizontal deflection system 22, respectively, in order to maintain their respective sweep generators in time synchronism with the scanning generators originating the video signal. The output of vertical deflection system 21 is then used to drive vertical deflection coils 23 while the output of system 22 is employed to drive horizontal deflection coils 24. The deflection fields established by coil pairs 23 and 24 cause the beam of tube 17 to course the screen thereof in a repeating series of fields of parallel lines at the same time that the beam is intensity modulated by video information. In this fashion, an image is reproduced on the screen while the accompanying sound information is reproduced by speaker 19.

Although tuner 11 and converter 12 have been represented separately in the schematic of FIGURE 1, in practice they are usually constructed as one component referred to as the front end. This portion of the receiver may take any of a variety of forms but it will be assumed that, so far as VHF is concerned, it is the familiar turret tuner equipped with channel-selection strips. Each such strip has frequency-selective circuits that may be brought into functional relation with the remainder of the receiver by rotating the turret until the particular strip is moved into coupling engagement with the stator of the tuner. When such engagement has been effected, the frequency selctors carried by the strip tune the antenna, the radio frequency amplifier which couples the antenna to the converter, the local oscillator and the input of the converter itself to achieve optimum reception of the signal channel to which the tuning strip in question has been assigned. An illustrative circuit arrangement for such a VHF tuning strip is fully disclosed and claimed in Patent 2,596,117 issued on May 13, 1952 in the name of John F. Bell et al. and structural features of a representative turret tuner are disclosed and claimed in Patent 3,016,-505 issued on January 9, 1962 to George C. Collins and in an application Serial No. 89,570 filed on February 15, 1961 in the name of Otto H. Schwartz, now Patent No. 3,144,626 which issued on Aug. 11, 1964; all of these are assigned to the assignee of the subject invention. Since the circuitry and structure of a turret tuner are well known, further elaboration is deemed unnecessary and attention will be confined to so much of the tuner as required to an understanding of the present invention.

So far as UHF is concerned, it is known to designate one position of the turret as its UHF position in which a "UHF tuning strip" of the turret causes a continuously variable UHF tuner to become effective and also tunes the stages which normally function as the radio-frequency amplifier and converter to now function as intermediate-frequency amplifiers coupled in cascade with the UHF tuner. The tuning arrangement to be described may also use this approach of coupling the UHF tuner to the remainder of the receiver through a UHF position of the VHF turret.

In particular, the embodiment of the invention shown in FIGURE 2 comprises a U-shaped bracket 29 for supporting a turret-type VHF tuner 30 having a plurality of operating positions to any of which it may be selectively adjusted by virtue of a tuning shaft 31 terminated in a driving pinion 32. In each VHF operating position of the turret the television receiver is conditioned for operation at a discrete channel in the VHF band. A fine tuning arrangement, such as that described in the aforementioned Schwartz application, is represented by enclosure 33 and permits fine-tuning adjustment of the channel strip that is instantaneously effective in controlling the receiver.

Mounted adjacent VHF tuner 30 on bracket 29 is a UHF tuner 34 which is described and claimed in application Serial No. 227,384 filed concurrently herewith for Clarence W. Wandrey, now Patent No. 3,182,274, which issued on May 4, 1965. Tuner 34 likewise has a plurality of operating positions selectable by a tuning shaft 35 which terminates in a driving pinion 36. As will be shown, the number of UHF operating positions is independent of the number of operating positions of VHF tuner 30 and vice versa. Each effective operating position of tuner 34 conditions the receiver for operation at a discrete channel in the UHF band. A manual tuning control 28, normally disengaged from the UHF tuner, may be coupled thereto through a push or pull-to-actuate clutch and a transmission 37 including a step-down gear train of conventional construction so that tuning adjustments are not so critical. Control 28 permits manual tuning over the entire UHF band as described more particularly hereinafter.

Also supported on bracket 29 is a programming mechanism 38 having a series of indexing positions, including one for each of the operating positions of both the VHF and UHF tuners. Driving means, comprising a motor and reduction gear assembly 39, are provided for actuating or stepping programming mechanism 38 through its indexing positions and also for actuating VHF and UHF tuners 30, 34 to maintain a given relation between the instantaneous indexing position of the programmer and the operating position of the VHF or UHF tuner corresponding thereto. As shown, a gear train 40 is mounted upon a master control shaft 41 and is employed for mechanically coupling drive means 39 to tuners 30, 34. Shaft 41 is rotatably supported by the end members of bracket 29. Since tuner mechanism 11 is readily amenable to manual control, shaft 41 is fitted with a controller 27 which can also serve as a channel indicator.

Figure 3:
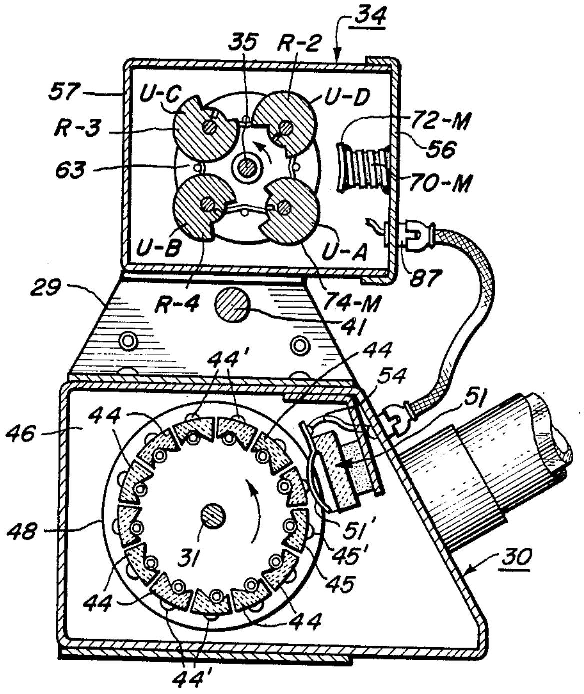
FIGURE 3 is a sectional view of the tuner mechanism of FIGURE 2 taken along lines 3—3.

Referring now to FIGURE 3, the housing of VHF tuner 30 has a pair of parallel end walls 46, only one shown, for rotatably supporting tuning shaft 31. The tuner has twelve frequency selectors or tuning strips 44 which individually serve to condition the receiver for operation on an assigned VHF channel. Additionally, the tuner includes a thirteenth or UHF strip 45 which, in a manner previously explained, converts the radio-frequency amplifier and converter normally associated with tuner 30 to stages of intermediate-frequency amplification during UHF operation. All of these strips are removably supported in a circular array about shaft 31 by a pair of axially aligned end panels 48, only one shown, fixed to and rotatable with shaft 31. Also fixed to shaft 31 is a detent plate 49, see FIGURE 2, the peripheral edge of which is scalloped to provide a series of indentations for cooperation with a roller 50 to afford a positive index for each of the thirteen operating positions of the turret.

Figures 4, 11:
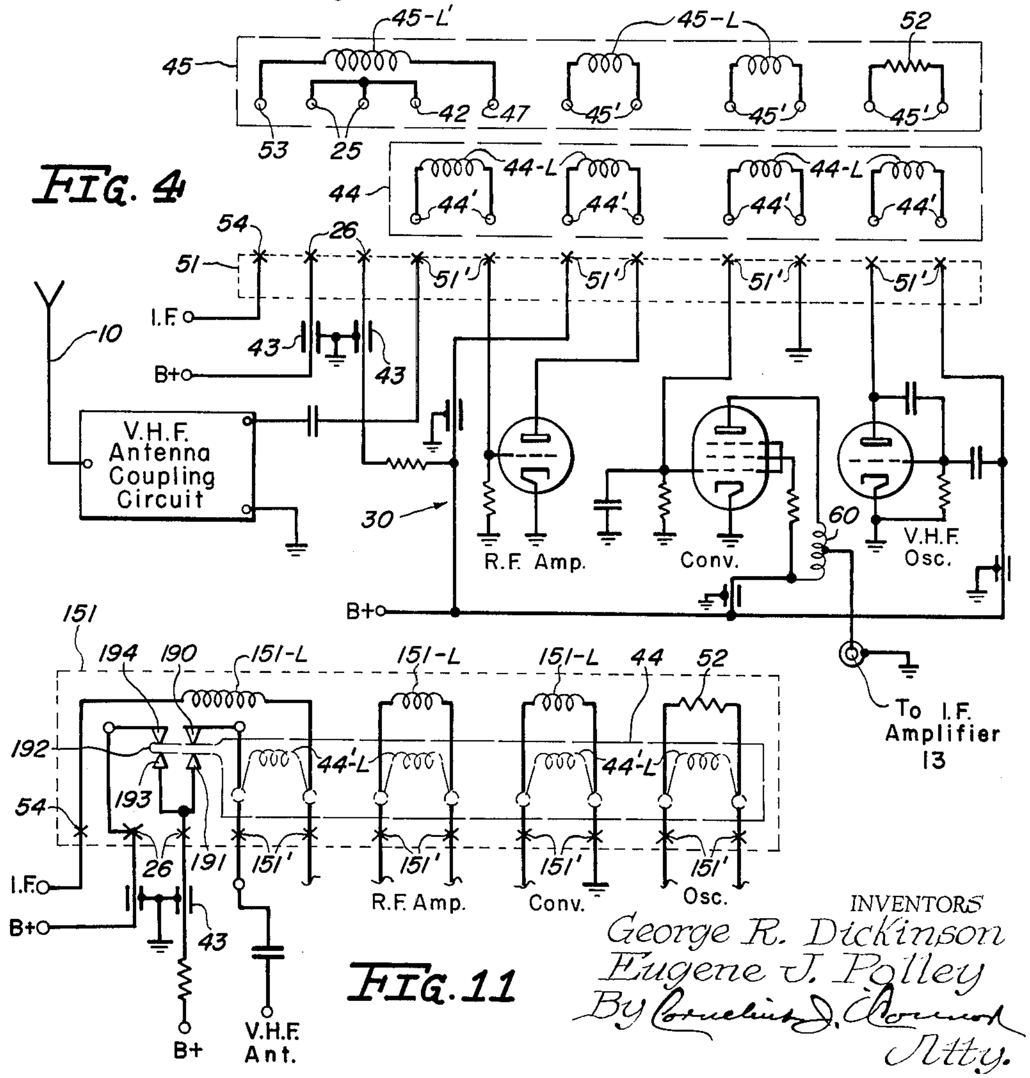
FIGURE 4 is a schematic diagram of the VHF tuner of FIGURE 2.
FIGURE 11 is a schematic representation of the stator assembly for the VHF tuner shown in FIGURE 10.

The frequency-determining elements, usually inductance coils, of turret strips 44 are identified by reference numerals 44–L and are provided with terminals having contact surfaces 44′ for presentation to a bank of ribbon contacts 51′ which are carried by a stator assembly 51 and characterized by a series of X-shaped symbols to distinguish them from the circular shaped strip contacts, see FIGURE 4. The engagement of strip contacts 44′ with stator contacts 51′ completes the circuit connections necessary to place the strip in operative relation with the RF amplifier, converter and oscillator of tuner 30 to the end that the receiver is tuned to a selected VHF channel. The converter stage includes an inductor 60 which is tuned to a predetermined intermediate-frequency. Since tuner 30 is conventional in construction, as well as in operation, the remaining circuit components, while shown schematically in FIGURE 4, are not specifically identified.

In a similar fashion, and as best illustrated in FIGURE 4, UHF strip 45 is provided with a series of frequency determining elements identified by reference numerals 45–L and terminated by contacts 45′ for registration with stator 51. With strip 45 effective, the VHF local oscillator is disabled, simply by inserting a high resistive impedance 52 in its plate circuit, and the RF amplifier and converter are converted to IF amplifiers tuned to the IF signal furnished by UHF tuner 34. Strip 45 further includes an input frequency determining element 45–L′ having a terminal 53 which mates with a terminal 54 on stator 51 to which the output circuit of the UHF tuner is connected in order to couple the output signal of the UHF tuner to strip 45. This signal is then delivered to the input of the RF amplifier via terminal 47 and thence to the other tuner stages which, during UHF operation, constitute added stages of IF amplification. Strip 45 also includes a pair of shorted terminals 25 positioned to mate with a pair of stator terminals 26 for the purpose of providing a circuit connection between the VHF tuner B+ supply and the oscillator of the UHF tuner during UHF operation. In order to neutralize VHF antenna 10 during UHF operation, strip 45 incorporates another terminal 42 which is directly connected to terminals 25 so that when strip 45 is in registration with stator 51, the feed-through filter capacitors 43 for the B+ supply effectively ground VHF antenna 10. VHF strip 44 has no counterparts to terminals 25 and 42 because it is unnecessary to ground the UHF antenna during VHF operation. This obtains not only because the UHF oscillator is de-energized when IF strip 45 is replaced by one of VHF strips 44, but also by virtue of the isolation afforded by the pre-selector and mixer stages of the UHF tuner.

Figure 5:
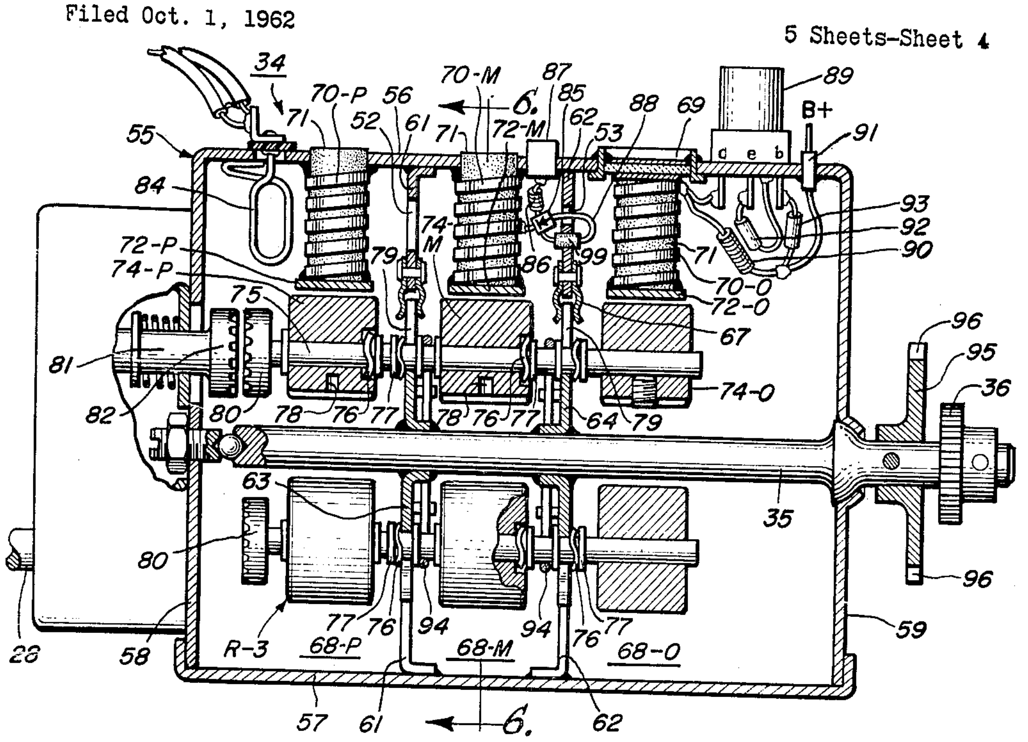
FIGURE 5 is a sectional view, partly broken away, of the UHF tuner portion of the mechanism shown in FIGURE 2.
Figure 6:
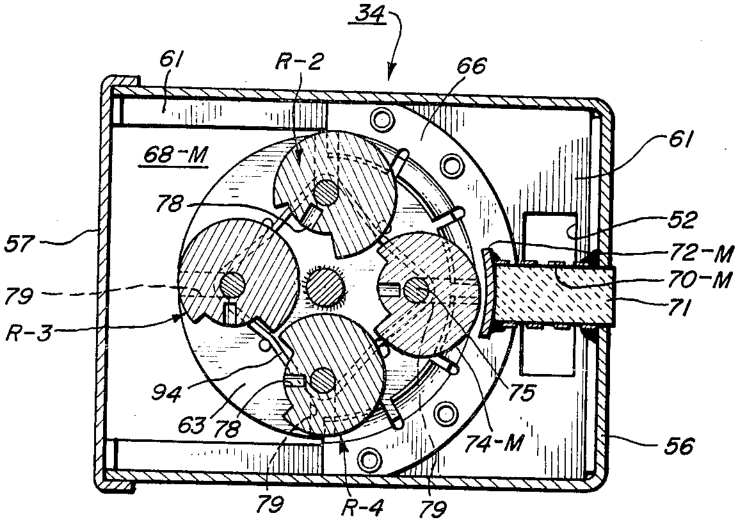
FIGURE 6 is a cross-sectional view of the UHF tuner taken along lines 6—6 of FIGURE 5.

UHF tuner 34 is also a turret-type device having a plurality of operating positions in each of which the television receiver is conditioned for operation at a discrete channel in the UHF band. To this end, and as best seen in FIGURES 5 and 6, tuner 34 comprises a housing 55 having a pair of side walls 56, 57 and a pair of end walls 58, 59 which rotatably support shaft 35. Secured to side walls 56, 57 and extending therebetween are partitions 61, 62. Spaced along shaft 35 and affixed thereto adjacent partitions 61, 62 are a pair of discs 63, 64. Secured to partitions 61, 62 and resiliently bearing on discs 63, 64, respectively, are pairs of multiple-fingered grounding leaves 66, 67. Partitions 61, 62 together with discs 63, 64 divide the tuner housing into three chambers or compartments constituting preselector, mixer and oscillator stages 68–P, 68–M and 68–O, respectively. Partition 61 includes a coupling window 52, see FIGURE 6, while partition 62 is provided with a coupling slot 53 and a feed-through capacitor 99.

Each of these stages includes a tunable circuit comprising a fixed inductor and an adjustable capacitor. To this end compartment 68–P is provided with an inductor 70–P having a plurality of conductor turns disposed upon a rigid bar 71 of an insulating material, e.g. steatite, which is anchored to side wall 56 of housing 55. One end of inductor 70–P is conductively connected to wall 56 while the opposite end is connected to an arcuate plate 72–P which is supported by bar 71 and which constitutes the fixed electrode of the adjustable capacitor.

The adjustable capacitor electrode associate with stationary electrode 72–P is in the form of a rotatable cam element 74–P which is frictionally secured upon a tuning shaft 75 by a spring washer 76 and a clip 77. In order to permit tracking adjustment cam 74–P is drilled out, as indicated at 78, to accommodate a tuning wand. Shaft 75 is rotatably journalled within an aligned pair of slots 79 in discs 63, 64 and frictionally secured therein by spring washers and clips 76, 77. The surface of cam electrode 74–P presented to electrode 72–P is so formed that, in rotating the cam between the limits bounded by its cam surface, the air gap between the two electrodes is varied in such a fashion as to tune inductance 70–P across the entire UHF band.

More particularly, the movable electrode has an arcuate section of constant radius subtending an angle of approximately 90 degrees. At one end of this section, the radius increases abruptly to a maximum and then decreases gradually around the cam surface to the opposite end of the constant-radius section. FIGURE 6 illustrates the contour of movable electrode 74–M which is similar to electrode 74–P. The manner in which the radius changes determines the tuning characteristic, that is to say, the effective capacitance of the adjustable condenser is a function of the instantaneous position of the movable electrode. Preferably, the change in capacitance with rotation of the movable electrode is approximately linear, in other words, equal increments of rotation of electrode 74–P between the aforementioned limits give rise to equal changes in capacitance.

In like fashion mixer and oscillator stages 68–M and 68–O are provided with respective inductors 70–M, 70–O which, in turn, are terminated by arcuate capacitor electrodes 72–M, 72–O. While inductor 70–M is conductively connected to wall 56, inductor 70–O is coupled to that reference plane via a disc type capacitor 69. Adjustable capacitor electrodes 74–M, 74–O, are substantially identical in form to cam 74–P and are similarly mounted on shaft 75 to confront fixed plates 72–M, 72–O, respectively, in a capacitive relation. As in the case of cam electrode 74–P, cam 74–M is also frictionally secured upon shaft 75 and provided with a hole 78 for receiving a tracking wand. Cam 74–O, on the other hand, is adjustably secured upon tuning shaft 75 by a conventional set screw. One end of tuning shaft 75 is terminated with a crown 80 disposed in axial alignment with a spring-biased adjusting tool 81 having a driving head 82 complementary in form to crown 80 and mechanically coupled to tuning control 28.

Figure 7:
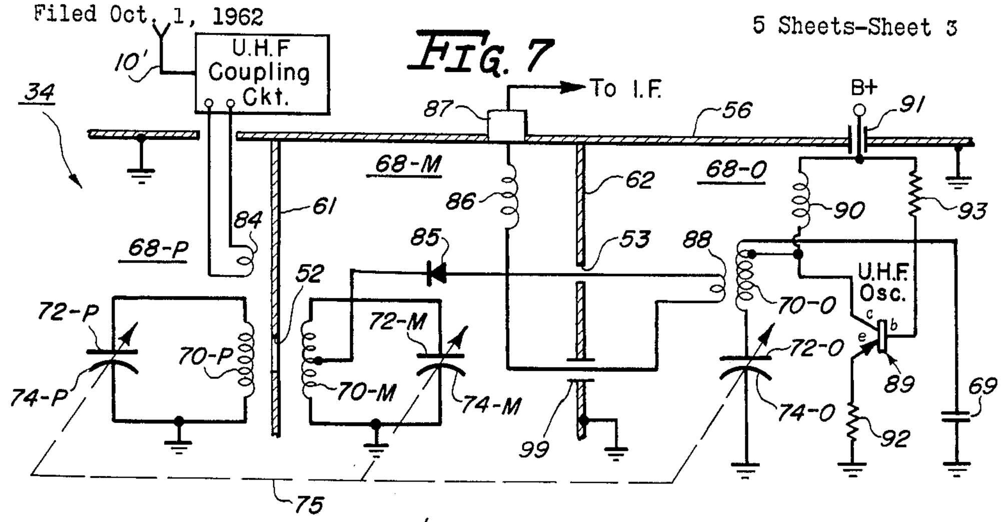
FIGURE 7 is a schematic diagram of the UHF tuner shown in FIGURE 5.

Electrically, inductor 70–P and capacitor 72–P, 74–P comprise the first section of a double-tuned RF input circuit while inductor 70–M and capacitor 72–M, 74–M constitute the second section thereof, see FIGURE 7. Inductor 70–O and capacitor 72–O, 74–O constitute a frequency-determining circuit for the local oscillator used in UHF reception. In addition to an inductor and a variable capacitor preselector, tuner stage 68–P has an input coupling coil 84 while mixer compartment 68–M includes a mixer crystal 85 connected between inductor 70–M and one terminal of feed-through capacitor 99. An IF coil 86 is coupled between the other terminal of feed-through capacitor 99 and an output jack 87 which leads to stator terminal 54.

Oscillator chamber 68–O is coupled to mixer crystal 85 by virtue of the lead portion 88 of the mixer crystal which protrudes through coupling slot 53. The oscillator stage further includes a transistor device 89 the collector of which is coupled to the junction of inductor 70–O and capacitor 69 and to a source of unidirectional potential through a choke coil 90 and a feed-through capacitor 91. The emitter is returned to a reference plane (housing wall 56) through a resistive impedance 92. The base electrode, in turn, is connected to the unidirectional source via a resistor 93. Electrically, this is a common form of a tuned collector transistor oscillator.

As thus far described UHF tuner 34 comprises preselector, mixer and oscillator compartments each having a capacitor rotor and stator assembly tunable across the UHF band. In order to permit preset tuning to more than one discrete frequency in the UHF band, three additional rotor assemblies R–2, R–3 and R–4 are provided each identical to the assembly shown in registration with stator electrodes 72–P, 72–M and 72–O in FIGURE 5. The additional rotor assemblies, as indicated in FIGURE 6, are journalled in assigned ones of slots 79 in discs 63, 64 and are retained within their respective slots by a wire spring 94.

Figure 9:
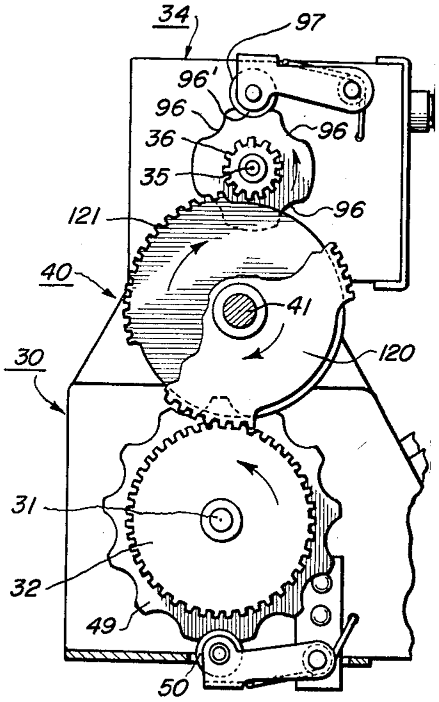
FIGURE 9 is a sectional view of the tuner mechanism, partly broken away, taken along lines 9—9 of FIGURE 2.

A detent mechanism for insuring proper spatial registration between the rotatable capacitor electrodes and the stationary electrodes of tuner 34 comprises a panel 95 affixed to shaft 35 and having a series of equally spaced peripheral notches or detents 96 corresponding to the four turret positions plus a quiescent or a park detent 96′ intermediate two of the turret notches which is best illustrated in FIGURE 9. The detent mechanism includes a roller 97, see FIGURES 2 or 9, positioned for cooperative engagement with the detents of panel 95.

It is appreciated, of course, that in order to accommodate the UHF stations available in any particular locale, the disclosed UHF turret mechanism can be altered to accept any desired number of rotor assemblies. Moreover, since each series of rotors together with the common stator assembly is capable of tuning across the UHF band by manipulation of tuning control 28, any or all may be pre-tuned to select an assigned UHF channel, in much the same fashion as VHF strips 44 select an assigned VHF channel. By the same token any of the assemblies can be utilized as a continuous UHF tuner in compliance with the aforementioned proposed legislation. It is also recognized that UHF frequency selectors having configurations other than the described rotor and stator arrangement may be utilized to achieve the objects of the invention, for example, frequency selectors comprising interleaving rotor and stator members tunable across the UHF band.

Figure 8:
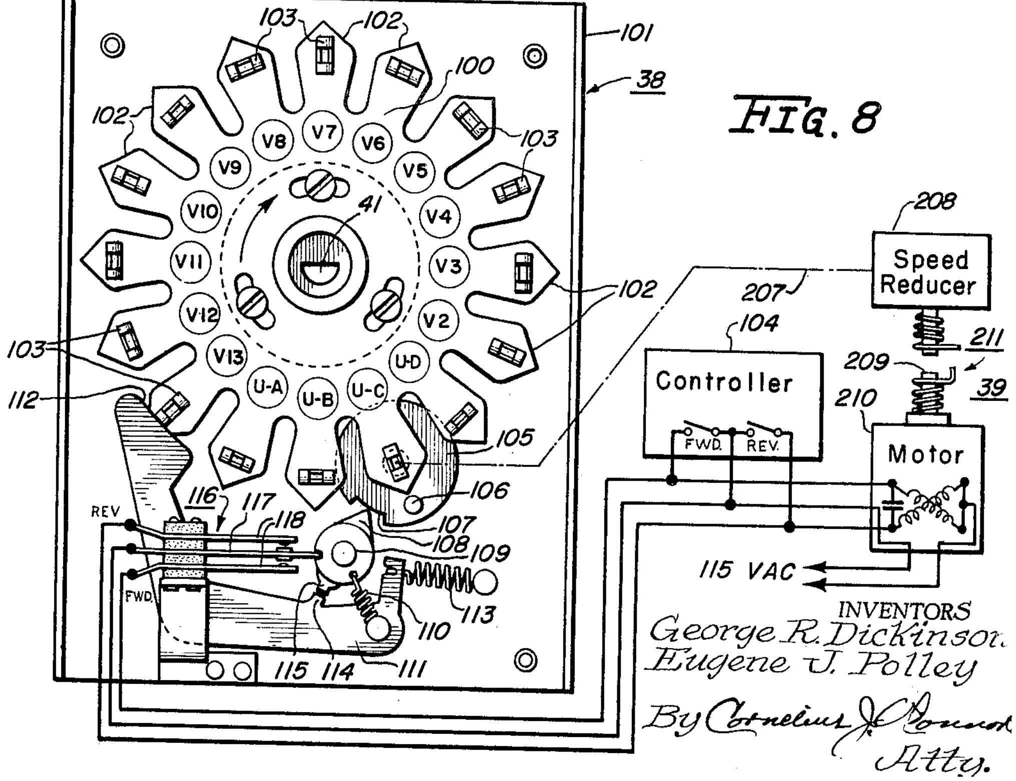
FIGURE 8 is an end view of the programming mechanism taken along lines 8—8 of FIGURE 2.

FIGURE 8 discloses the manner in which programming mechanism 38 provides a series of indexing positions including one for each of the operating positions of the VHF and UHF tuners. Except for an alteration to accommodate the four UHF operating positions, the programming mechanism shown in FIGURE 8 is substantially identical to the control apparatus for positioning a shaft to a preselected one of a plurality of operating positions disclosed in patent application Serial No. 629,976 filed December 21, 1956 in the name of Eugene J. Polley, now Patent 3,070,736.

More particularly, mechanism 38 comprises a Geneva wheel 100 affixed to master control shaft 41 and journalled upon a mounting plate 101. Wheel 100 is provided with a plurality of circumferentially disposed and equally spaced teeth 102 each of which carries an adjustable two-position index tab 103. Taken together, teeth 102 actually constitute a continuous cam surface about the periphery of wheel 100. In order to facilitate a subsequent explanation of this programmer, teeth 102 are marked V–2–V–13, and U–A–U–D to designate, respectively, the twelve VHF channels and four UHF channels. These designations, in turn, correspond with similar markings on manual control 27.

A driver cam 105, having a drive pin 106 eccentrically mounted thereon, is journalled on plate 101 along an axis substantially parallel to the axis of shaft 41. As depicted in FIGURE 8 cam 105 is in its reference position. Cam 105 is mechanically connected to the output shaft, shown diagrammatically by a dotted line 207, of a speed reducer 208 of motor assembly 39. The input shaft to the speed reducer is coupled to the rotor 209 of a reversible electric motor 210 through a wire clutch 211. Rotor 209 is spring biased to release clutch 211 but is axially displaceable in response to the application of energizing potential to motor 210 in order to effect a driving engagement with the speed reducer through wire clutch 211. By virtue of this arrangement, the rotor of motor 210 is instantly decoupled from its speed reducer when the motor is de-energized thereby precluding over-travel of index wheel 100 and, as a consequence, tuner control shaft 41.

Upon a single complete revolution of cam 105, in either a clockwise or counterclockwise direction from the reference position shown in FIGURE 8, pin 106 traverses the surface extending between adjacent teeth 102 of the Geneva wheel to effect a step rotation thereof. The periphery of cam 105 has a cut away section 107 which, under certain operating conditions, is presented to the cam follower extension 108 of a rotatably mounted pawl 109 which is biased to a reference position by a spring 110. In particular, whenever cam 105 is arrested in its reference position shown in FIGURE 8, gap 107 receives extension 108.

Pawl 109 together with a cam lever 111, which is pivotally mounted on bracket 101, constitute a holding arrangement for preventing de-energization of the drive motor after it has been initially excited. Initial excitation of motor 210 is governed by a controller 104 which is coupled to forward and reversing circuitry incorporated within motor 210 and of a type described in the aforementioned Polley patent. Controller 104 may be actuated by simple push-button switches or, preferably, by the ultrasonic remote control system described in the Polley patent. More particularly, cam lever 111 includes a cam surface 112 for sensing index tabs 103. Depending on the orientation of tabs 103, i.e. whether a given tab is disposed along a radius of Geneva wheel 100 or is perpendicular thereto, lever 111 is positioned to either a releasing or a holding position, respectively, by a biasing spring 113. Lever 111 also includes a projection 114 positioned to abut an edge of a tab 115 extending from pawl 109 for the purpose of locking the pawl against the bias of its spring 110 whenever the pawl has been displaced from its reference position and lever 111 is in a hold position.

A single pole double throw switch 116 comprises a central flexible contact arm 117 and a pair of outer flexible contact arms 118 which are returned to the forward and reversing circuitry incorporated in motor 210. The free end of switch arm 117 extends into a slot formed in pawl 109 so that either the forward or reversing circuit of motor 210 is closed when pawl 109 is displaced from its reference position by driver cam 105. Switch 116 thus constitutes means responsive to the displacement of pawl 109 from its reference position for maintaining drive motor 210 energized until such time as an indexing tab 103, oriented along a radius of Geneva wheel 100 and, therefore, perpendicular to cam surface 112, restores lever 111 to its reference position withdrawing tab 115 from abutting relation with lug 114 as required to permit pawl 109 to be returned to its reference position in which switch arm 117 is in its open position.

In addition to electric motor 210, the driving means for actuating the VHF and UHF tuners includes, as best seen in FIGURES 2 and 9, a pair of segmental gears 120, 121 which are keyed upon shaft 41 for rotation in unison. Gears 120, 121 are axially spaced along shaft 41 for alternately engaging pinions 32, 36, respectively, of the VHF and UHF tuners. Except for a brief transitional period, when control shaft 41 is coupled to pinions 32 and 36 simultaneously, the tuners are driven sequentially. To this end, each of gears 120, 121 is partially mutilated so that one presents a non-driving surface to its pinion when the other is in a driving relation with its pinion. Accordingly, and as best illustrated by FIGURE 9, when the toothed portion of gear 121 approaches engagement with pinion 36, the toothed portion of gear 120 is almost to the point of departure from pinion 32.

The period of simultaneous actuation of both turrets is determined by programming arrangement 38 when, in the disclosed embodiment, provides 16 indexing positions, 12 VHF and 4 UHF. When VHF tuner 30 assumes its 13th or UHF position, the UHF turret must simultaneously be rotated to one of its operating positions, and additionally, the driving arrangement must accommodate clockwise as well as counterclockwise rotation of master control shaft 41. For this reason a standby position is provided for the UHF turret; it is the position established by detent 96'. In the standby position, as shown in FIGURE 3, the UHF turret is oriented so that none of the rotor assemblies is in effective coupling relation with the stator electrode assembly. This may be considered an inoperative position of the tuner since it is not, at this moment, tuned within the UHF band. Thus no UHF antenna disabling circuit is required during VHF operation since the UHF oscillator is effectively neutralized in its standby position. When the toothed portion of gear 121 encounters pinion 36, the turret is initially displaced from this inoperative position to an operating position in which the tuner is tuned within the band. Of course, the particular operating or effective position reached is determined by the direction of rotation of gear 121.

The orientation of gear 121 on shaft 41 is such that when control shaft 41 is rotated, in one direction, pinion 36 is engaged by gear 121 as the VHF turret approaches the half-way point between the channel 13 strip and the UHF strip. Alternatively, when shaft 41 is rotated in the opposite direction, pinion 36 is engaged by gear 121 as the VHF turret approaches the mid-point between the strip for channel 2 and the UHF strip. In either case, gear 121 drives pinion 36 for the remainder of the step rotation of shaft 41 and in so doing displaces the UHF turret from its standby position to one of the two flanking UHF positions, the particular one being determined by the direction of rotation of shaft 41. By the same token, as the tuner is advanced from UHF to VHF channel selection by manipulation of control 27, for example, gear 121 rotates the UHF turret to its standby position and then disengages pinion 36. Concurrently, gear 120 engages pinion 32 and steps the VHF tuner from its UHF strip position to the channel 2 or channel 13 position, again depending on the direction of rotation. With this arrangement, control 27 always correctly indicates the operating condition of the VHF-UHF tuner mechanism, irrespective of the direction in which it is driven for channel selection. Of course, as the UHF turret is stepped from one of its channel-selection positions to the next, the mutilated section of gear 120 is presented to pinion 32 so that the VHF turret is stationary, and vice versa.

Obviously, both pinions 32 and 36 are required to make one complete revolution within a single revolution of shaft 41. This is accomplished by appropriate selection of gear ratios in regard to the number of detent positions for the turrets. For the described arrangement gears 120 and 32 are in the ratio of 16:13 while gears 121 and 36 are in the ratio of 16:4.

In using the described VHF-UHF tuner mechanism, VHF strips 44 are first pre-tuned to be selective to individually assigned VHF channels and UHF strip 45 is pre-tuned to condition the VHF amplifier and converter tubes to operate as amplifiers at the intermediate-frequency developed in the mixer portion of the UHF tuner; this may, for example, be 45 megacycles. Additionally, each of the UHF rotor assemblies is pre-set to select an assigned UHF channel. To accomplish this each rotor assembly, in turn, is brought into registration with the stator electrode assembly by manipulation of channel selector 27. Then tuning control 28 is actuated to effect a driving engagement between tool 81 and the crowned termination of rotor shaft 75. Thereafter control 28 is rotated and when the desired channel has been tuned, tool 81 is released. If necessary, tracking adjustments are performed on cams 74–P, 74–M. When the pre-set operations have been completed, discrete VHF or UHF channels may be received by manually rotating control 27 or by remotely actuating programmer 38.

As shown in FIGURE 2, tuner mechanism 11 is positioned to receive VHF channel 13. To manually select a different VHF channel, control 27 is rotated clockwise causing shaft 41 to drive pinion 32 through gear 120 until the contacts of the desired VHF channel strip are in registration with the contacts of stator 51. Their registration tunes the front end of the receiver, in particular the RF amplifier, the local oscillator and the converter to effect selection of the desired VHF channel and a conversion of that signal to the intermediate frequency of the receiver. This intermediate frequency signal is derived from the converter tube by inductor 60 from whence it is coupled to IF amplifier 13. Of course, a desired VHF channel can also be selected by rotating control 27 in a counterclockwise direction, as viewed in FIGURE 2, through the UHF positions until the desired channel is reached.

To select a UHF station, for example channel C, and assuming again that the VHF and UHF turrets occupy the position shown in FIGURE 2 in which the receiver is tuned to VHF channel 13, control 27 is rotated in a counterclockwise direction. This results in rotation of the various members of the tuner mechanisms in the directions indicated by the curved arrows in FIGURES 3, 8 and 9. As control shaft 41 and multilated gears 120, 121 rotate in the direction shown, pinion 32 drives the VHF turret to position UHF strip 45 in registration with stator 51. Meanwhile, after approximately one-half of this rotational step has been accomplished, the lead tooth on gear 121 intercepts pinion 36 and displaces the UHF turret from its standby position as previously explained. Continued rotation of control 27 brings the cam electrodes which have been pre-set to select UHF channel C into coupling relation with the stator electrode assembly.

The signal broadcast on UHF channel C is selected by the double-tuned preselector 72–P, 74–P and 72–M, 74–M and applied to mixer crystal 85. Concurrently, the heterodyne oscillator including tuned circuit 72–O, 74–O, applies a heterodyning signal via loop 88 to mixer crystal 85. Conventional mixer action then develops an IF signal which is selected by a tuned output circuit including inductor 86. This IF signal is coupled from output jack 87 to the input selector of UHF strip 45 of the VHF tuner for amplification and translation to IF amplifier 13 of the television receiver proper.

VHF or UHF channel selection can also be achieved by a remote control operation. After tabs 103 have been oriented in a predetermined programming arrangement, that is, with the desired channels having their assigned tabs oriented radially with respect to wheel 100, controller 104 is actuated in the manner described in the Polley patent to energize motor 210 and close clutch 211. Immediately, driver cam 105 rotates from its reference position displacing pawl 109 which, in turn, closes holding switch 116 to maintain motor 210 energized. Simultaneously, index wheel 100, in response to a driving force imparted by cam 105, rotates control shaft 41 to actuate the VHF or UHF tuner as described. Program wheel 100 continues to rotate until the next one of tabs 103, which is positioned along a radius of wheel 100, is encountered or sensed by cam surface 112 of lever 111. At such time lever 111 returns to its reference position, thereby permitting pawl 109 to assume the position of FIGURE 8 in which switch 116 is open and the tuning stops. If the channel selected is not the desired one, this process is continued until the wanted channel is tuned in.

The combined VHF-UHF tuner has been described on the basis of pre-set adjustment for VHF and UHF channel-selecting positions. This is not a limitation on the structure because when the arrangement has been adjusted to any UHF channel-selecting position, tuning control 28 may be actuated to tune continuously over any desired portion, or even the entirety, of the UHF band.

Figures 10, 12:
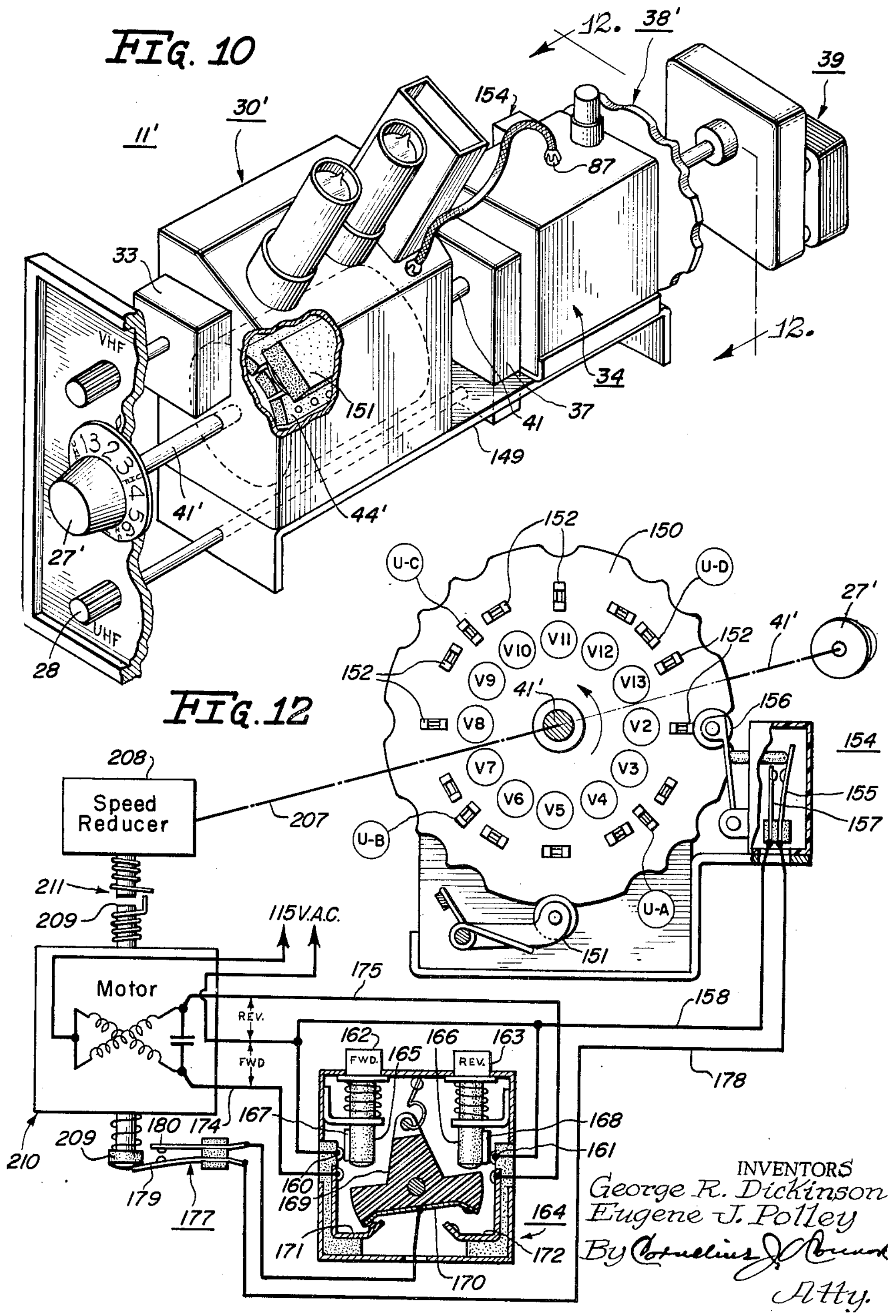
FIGURE 10 is a perspective view, partly broken away, of an alternate embodiment of a VHF-UHF tuner mechanism embodying the invention.
FIGURE 12 is a composite view of the programming mechanism which is taken along lines 12—12 of FIGURE 10 and includes a schematic representation of the driving arrangement.

The VHF-UHF tuner mechanism 11′ of FIGURE 10 comprises an alternate embodiment of the subject invention in which a VHF tuner 30′ having 12 tuning strips and UHF tuner 34 are mounted in tandem along a common shaft 41′ and upon a common base 149. Except for programming device 38′, which has been altered to dispense with the gear train arrangement of the principal embodiment, and the VHF stator 151, the remaining constituents of tuner mechanism 11′ are substantially identical to those employed in the principal embodiment. Stator 151 now functions as the device which, in the absence of a registering VHF strip, conditions tuner 30′ as an IF amplifier. More particularly, and as best seen in FIGURE 11, stator 151 comprises a series of inductance coils 151–L and a resistor 52 terminated by pairs of contacts 151′. Stator 151 duplicates the functions of UHF strip 45 by virtue of the fact that the stator mounted resistor and coils disable the VHF oscillator and convert the RF and heterodyne circuits of VHF tuner 30′ to IF amplifiers during UHF operation.

In addition to IF terminal 54 and B+ terminals 26, stator 151 employs a pair of normally closed VHF antenna switch contacts 190, 191 and a pair of normally closed B+ switch contacts 193, 194. Antenna contact 190 is connected to the stator terminal 151′ that is coupled to the VHF antenna, while contact 191 is connected to the B+ source. Since the B+ source is by-passed to ground by feed-through capacitor 43, the VHF antenna is effectively grounded when switch contacts 190, 191 are closed.

Contact 193 is returned to the B+ source and contact 194 is connected to terminal 26 which, in turn, is connected to the center conductor of the B+ feed-through capacitor 91 mounted on the UHF tuner, see FIGURE 7. Thus when contacts 193, 194 are closed, B+ is supplied to UHF tuner 34.

Each of the 12 VHF tuning strips 44′ employed in tuner 30′ is tailored so that its circuits, which are shown by broken-line construction in FIGURE 11, in conjunction with the aforementioned stator circuitry restore the RF and heterodyning circuits of tuner 34 to their normal functions during VHF operation. Additionally, each of VHF strips 44′ includes a switch actuator 192 to open the normally closed antenna switch contacts 190, 191 and B+ contacts 193, 194, whenever a VHF strip is in registration with stator 151. When contacts 190, 191 are open, the UHF antenna is coupled to the input of the VHF tuner amplifier and B+ is removed from UHF tuner 34. It is not necessary to ground or neutralize the UHF antenna during VHF operation since that antenna is, for all practical purposes, de-coupled from the VHF tuner input by the preselector and mixer stages 68–P and 68–M of the UHF tuner and also because oscillator 89 is de-energized.

Programming mechanism 38′ comprises an indexing wheel 150 keyed upon shaft 41′ and having a peripheral edge scalloped at 12 equally spaced points to afford detents for the 12 VHF channels, see FIGURE 12. To provide detents for UHF operating positions A–D, the peripheral edge is further scalloped at four points intermediate VHF channels 3–4, 6–7, 9–10 and 12–13. With this indexing arrangement only one of the turrets of tuners 30′ and 34 is in registration with stator 151 for any particular operating condition of tuner mechanism 11′. In other words, when the detent is positioned for registration with cooperating roller 151 on a VHF channel, the UHF turret is in an intermediate or inoperative position and vice versa.

Programmer 38′ additionally constitutes a support for a series of index tabs 152, including one for each of the VHF and UHF operating positions and designated V–2–V–13 and U–A–U–D, respectively. For all intents and purposes tabs 152 are identical to tabs 103 shown in FIGURE 8.

Associated with indexing wheel 150 is a single-pole single-throw carry-over switch 154 comprising an elongated flexible contact arm 155 provided with an actuator 156 that lies in the rotational path of those index tabs 152 which have been displaced to a position along a radius of wheel 150. Switch 154 also includes a relatively fixed contact arm 157 connected to a conductor 158 which is returned to a source of energizing potential. Arm 157 is also connected to the auxiliary contacts 160, 161 associated with a pair of forward and reversing momentary contact start switches 162, 163, which may constitute remotely actuated relay devices, of a controller 164 for drive motor 210. Switches 162, 163 are normally biased open and include respective plungers 165, 166 having contact surfaces 167, 168. Plungers 165, 166 are poised over a spring-loaded rotatably mounted bi-stable toggle 169. Toggle 169 includes a bar contact 170 which, in turn, is poised over a pair of L-shaped stationary terminals 171, 172 which are returned, respectively, to the forward and reverse control windings of motor 210 by conductors 174, 175. Bar contact 170 is connected to contact arm 155 of carry-over switch 154 through a motor-actuated switch 177 via conductor 178. Switch 177 comprises a pair of normally opened contacts 179, 180, of which contact 179 is positioned in the path of motor shaft 209 to the end that axial displacement of shaft 209 opens the switch when motor 210 is de-energized. Contacts 179, 180 are disposed in series relation between contact arm 155 and toggle contact 170.

To manually operate the tandem embodiment of FIGURE 10, control 27′ is simply rotated until the desired channel is selected by registration of a discrete VHF or UHF channel with its associated stator. Except for the fact that switch actuator 192 carried by each VHF strip 44′ must initially open the VHF antenna grounding switch 190, 191 and the UHF B+ contacts 193, 194, tuner 30′ operates in the same fashion as VHF tuner 30. As previously noted, when strip 44′ is in registration with stator 151, each of the inductors on strip 44′ cooperates with frequency determining elements 151–L to achieve RF selection and heterodyning action.

Basically, the operation of UHF tuner 34 is also as previously described. The IF output of tuner 34 is coupled to stator terminal 54 and from there to the frequency determining circuits 151–L of stator 151 which condition tuner 30′ as an IF amplifier.

The tuner embodiment of FIGURE 11 is also amenable to an electrical control arrangement. Assuming that the tuner mechanism is to be repositioned from the position shown in FIGURES 10 and 12, wherein tab 152 for VHF channel 2 is in registration with switch actuator 156, to the operating position for UHF channel A. Assume also that counterclockwise rotation of index wheel 150 is achieved by driving motor 210 in the forward direction. Plunger 165 is then actuated by either manually depressing forward relay switch 162 or by resort to an ultrasonic control system of the type referred to in the Polley patent to achieve the same purpose. Contact surface 167 of plunger 165 upon bridging contacts 160, 171 effects a momentary connection between leads 158 and 174 thereby shunting carry-over switch 154 and motor switch 177 to energize motor 210. Instantly motor shaft 209 is retracted, permitting switch 177 to close while simultaneously effecting a driving connection with program wheel 150 via clutch 211, speed reducer 208 and shaft 41′. This momentary energizing connection is sufficiently long to permit the program wheel to remove the radially oriented tab 152 for VHF channel 2 from engagement with actuator 156 thus enabling switch 154 to close and to provide a connection between conductor 158 and lead 178. At this same time plunger 165 displaces toggle 170 to the position shown in FIGURE 12 thereby effecting a circuit connection between leads 178 and 174 through switch 177. Motor 210 remains energized until the radially oriented tab 152 for UHF channel A encounters switch actuator 156. Switch 154 is then opened which disconnects conductor 158 and lead 178 to de-energize motor 210. Instantaneously motor shaft 209 is returned to the reference position shown in FIGURE 12, disengaging clutch 211 and opening switch 177. At the same time detent roller 151 locks wheel 150 and, of course drive shaft 41′, to maintain the cam rotor assembly for UHF channel A in registration with its stator electrode assembly.

Except for the direction of rotation of the motor and program wheel, operation in the reverse direction is identical to that described above. Since switch 177 cannot be closed until motor 210 is again energized by either of relay switches 162, 163, the tuner mechanism can be freely rotated by manual control 27′ without interference from the motor in spite of the fact that carry-over switch 154 closes each time a radially oriented tab 152 is encountered.

Accordingly, the subject invention constitutes a novel VHF-UHF tuner arrangement for conditioning a television receiver for operation at discrete frequencies in either the VHF or the UHF spectrum. The VHF-UHF tuner mechanisms disclosed find particular utility in those applications, such as remote control, where positioning the tuner to a discrete frequency is mandatory.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

We claim:

1. A tuner mechanism for a television receiver comprising:

a VHF tuner having a series of detented operating positions in each of which said receiver is conditioned for operation at a predetermined channel in the VHF band;

an UHF tuner comprising a stator assembly, a displaceable carriage, carriage indexing means, and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band, each said frequency selector being independent of the other said selectors so as to constitute, upon presentation to said stator assembly, a detented operating position in which said receiver is conditioned for operation at the desired UHF channel assigned thereto, and the number of said UHF operating positions being independent of the number of said VHF operating positions;

a programming mechanism having a series of indexing positions including one for each of said operating positions of both said VHF and UHF tuners;

and drive means for actuating said programming mechanism in discrete steps throughout its said indexing positions and for actuating said VHF and UHF tuners through their said operating positions to maintain a given relation between the instantaneous position of said programming mechanism and the detented operating position of said VHF and UHF tuners corresponding thereto so that, upon actuation of said programming mechanism, successive VHF and selected UHF channels are tuned, seriatim, at successive ones of said indexing positions.

2. A tuner mechanism for a television receiver comprising:

a VHF tuner having a series of detented operating positions in each of which said receiver is conditioned for operation at a predetermined channel in the VHF band;

an UHF tuner comprising a stator assembly, a displaceable carriage, carriage indexing means, and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band, each said frequency selector being independent of the other said selectors so as to constitute, upon presentation to said stator assembly, a detented operating position in which said receiver is conditioned for operation at the desired UHF channel assigned thereto, and the number of said UHF operating positions being independent of the number of said VHF operating positions;

a programming mechanism having two series of indexing positions corresponding in number to said operating positions of said VHF and UHF tuners, respectively;

drive means for actuating said programming mechanism in discrete steps throughout its said indexing positions;

means for actuating said VHF and UHF tuners through their said operating positions in synchronism with the actuation of said programming mechanism through said two series of indexing positions, respectively, so that upon actuation of said programming mechanism, successive VHF and selected UHF channels are tuned, seriatim, at successive ones of said indexing positions;

and means for rendering said VHF tuner effective for channel selection during one and for rendering said UHF tuner effective for channel selection during the other of said two series of indexing positions.

3. A tuner mechanism for a television receiver comprising:

a VHF tuner having a series of detented operating positions in each of which said receiver is conditioned for operation at a predetermined channel in the VHF band;

an UHF tuner comprising a stator assembly, a displaceable carriage,
carriage indexing means,
and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band,
each said frequency selector being independent of the other said selectors so as to constitute, upon presentation to said stator assembly, a detented operating position in which said receiver is conditioned for operation at the desired UHF channel assigned thereto,
and the number of said UHF operating positions being independent of the number of said VHF operating positions;
a programming mechanism having two separate series of indexing positions corresponding in number to said operating positions of said VHF and UHF tuners, respectively;
drive means for actuating said programming mechanism in discrete steps throughout its said indexing positions;
means for actuating said VHF tuner through its said operating positions in synchronism with and only during the actuation of said programming mechanism through one of said series of indexing positions and for actuating said UHF tuner through its said operating positions in synchronism with and only during the actuation of said programming mechanism through the other of said series of indexing positions, so that upon actuation of said programming mechanism, successive VHF and selected UHF channels are tuned, seriatim, at successive ones of said indexing positions;
and means for rendering said VHF tuner effective for channel selection during one and for rendering said UHF tuner effective for channel selection during the other of said two series of indexing positions.

4. A tuner mechanism for a television receiver comprising:
a VHF tuner having a series of detented operating positions in each of which said receiver is conditioned for operation at a predetermined channel in the VHF band and having a standby position in which said VHF tuner is ineffective for channel selection;
an UHF tuner comprising a stator assembly,
a displaceable carriage,
carriage indexing means,
and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band,
each said frequency selector being independent of the other said selectors so as to constitute, upon presentation to said stator assembly, a detented operating position in which said receiver is conditioned for operation at the desired UHF channel assigned thereto,
and the number of said UHF operating positions being independent of the number of said VHF operating positions,
said UHF tuner further having a standby position in which said UHF tuner is ineffective for channel selection;
a programming mechanism having two separate series of indexing positions corresponding in number to said operating positions of said VHF and UHF tuners, respectively;
drive means for actuating said programming mechanism in discrete steps throughout its said indexing positions;
means for actuating said VHF tuner through its said operating positions in synchronism with and only during the actuation of said programming mechanism through one of said series of indexing positions and for maintaining said VHF tuner in its said standby position during the actuation of said programming mechanism through the other of said series of indexing positions;
and means for actuating said UHF tuner through its said operating positions in synchronism with and only during the actuation of said programming mechanism through said other series of indexing positions and for maintaining said UHF tuner in said standby position during the actuation of said programming mechanism through said one series of indexing positions,
whereupon actuation of said programming drive means, successive VHF and selected UHF channels are tuned, seriatim, at successive ones of said indexing positions.

5. A tuner mechanism for a television receiver comprising:
a VHF tuner having a series of detented operating positions in each of which said receiver is conditioned for operation at a predetermined channel in the VHF band and having a standby position in which said VHF tuner is ineffective for channel selection;
an UHF tuner comprising a stator assembly,
a displaceable carriage,
carriage indexing means,
and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band,
each said frequency selector being independent of the other said selectors so as to constitute, upon presentation to said stator assembly, a detented operating position in which said receiver is conditioned for operation at the desired UHF channel assigned thereto,
and the number of the UHF operating positions being independent of the number of said VHF operating positions,
said UHF tuner further having a standby position in which said UHF tuner is ineffective for channel selection;
a programming mechanism having two separate series of indexing positions corresponding in number to said operating positions of said VHF and UHF tuners, respectively;
drive means for actuating said programming mechanism in discrete steps throughout its said indexing positions;
means for actuating said VHF tuner through its said operating positions in synchronism with and only during the actuation of said programming mechanism through one of said series of indexing positions and for maintaining said VHF tuner in its said standby position during the actuation of said programming mechanism through the other of said series of indexing positions;
and means for actuating said UHF tuner through its said operating positions in synchronism with and only during the actuation of said programming mechanism through said other series of indexing positions and for maintaining said UHF tuner in said standby position during the actuation of said programming mechanism through said one series of indexing positions,
said actuating means for said VHF and UHF tuners being so phased that each tuner assumes its said standby position as the other is displaced from its standby position to a channel-selection operating position, so that upon actuation of said programming drive means, successive VHF and selected UHF channels are tuned, seriatim, at successive ones of said indexing positions.

6. A tuner mechanism for a television receiver comprising:

a VHF tuner having a series of detented operating positions in each of which said receiver is conditioned for operation at a predetermined channel in the VHF band and having a standby position in which said VHF tuner is ineffective for channel selection;

an UHF tuner comprising a stator assembly, a displaceable carriage, carriage indexing means, and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band, each said frequency selector being independent of the other said selectors so as to constitute, upon presentation to said stator assembly, a detented operating position in which said receiver is conditioned for operation at the desired UHF channel assigned thereto, and the number of said UHF operating positions being independent of the number of said VHF operating positions, said UHF tuner further having a standby position in which said UHF tuner is ineffective for channel selection;

a programming mechanism having two separate series of indexing positions corresponding in number to said operating positions of said VHF and UHF tuners, respectively;

drive means for actuating said programming mechanism in discrete steps throughout its said indexing positions;

means for actuating said VHF tuner through its said operating positions in synchronism with and only during the actuation of said programming mechanism through one of said series of indexing positions and for maintaining said VHF tuner in its said standby position during the actuation of said programming mechanism through the other of said series of indexing positions;

and means for actuating said UHF tuner through its said operating positions in synchronism with and only during the actuation of said programming mechanism through said other series of indexing positions and for maintaining said UHF tuner in said standby position during the actuation of said programming mechanism through said one series of indexing positions, said actuating means for said VHF and UHF tuners including a drive shaft having a pair of mutilated gears rotatable with said drive shaft and intermittently coupled to said VHF and UHF tuners, respectively, and having such angular orientation upon said shaft that each such tuner assumes its standby position as the other is displaced from its standby position to a channel-selection operating position, so that upon actuation of said programming drive means, successive VHF and selected UHF channels are tuned, seriatim, at successive ones of said indexing positions.

7. A VHF-HF tuner mechanism for a television receiver comprising:

a main control shaft;

a VHF tuner having a turret for supporting a series of VHF channel selectors, a channel selector shaft coupled to said turret and detent means coupled to said turret for establishing a corresponding series of tuner operating positions in each of which said receiver is conditioned for operation at a desired channel in the VHF band;

an UHF tuner comprising a selector shaft, a displaceable carriage coupled to said UHF selector shaft, a stator assembly, carriage indexing means, and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band, each said frequency selector being independent of the other selectors so as to constitute, upon presentation to said stator assembly, a detented operating position in which said receiver is conditioned for operation at the desired UHF channel assigned thereto, and the number of said UHF operating positions being independent of the number of said VHF operating positions;

a programming mechanism coupled to said main control shaft and having first and second series of indexing positions each corresponding in number to said operating positions of said VHF and said UHF tuners, respectively;

drive means for actuating said programming mechanism in discrete steps through its said indexing positions;

means for coupling said main control shaft to said VHF selector shaft for actuating said VHF tuner through its said operating positions in synchronism with the actuation of said programming mechanism through said first series of its said indexing positions and for coupling said main control shaft to said UHF selector shaft for actuating said UHF tuner through its said operating positions in synchronism with the actuation of said programming mechanism through said second series of its said indexing positions, so that upon actuation of said programming mechanism, successive VHF and selected UHF channels are tuned, seriatim, at successive ones of said indexing positions.

8. A tuner mechanism for a television receiver comprising:

a turret-type VHF tuner having a plurality of tuning strips individually tuned to an assigned channel in the VHF band and having a like plurality of channel-selecting detented operating positions in each of which one of said strips is effective to tune the receiver;

a turret-type UHF tuner having a stator assembly, a rotatable carriage, carriage indexing means and a plurality of channel selectors supported upon said carriage for sequential presentation to said stator assembly upon arrest of said carriage by said indexing means, each of said selectors being individually, independently and semi-permanently tunable to select any of all of the channels of the UHF band, each said channel selector being independent of the other said selectors so as to constitute, upon presentation to said stator assembly, a detented operating position in which said receiver is conditioned for operation at the desired UHF channel assigned thereto, a programming mechanism having a series of indexing positions including one for each of said operating positions of both said VHF and UHF tuners;

and driving means for actuating said programming mechanism throughout its said indexing positions and for actuating said VHF and UHF tuners to maintain a given relation between the instantaneous indexing positions of said programming mechanism and the operating position of said VHF and UHF tuners corresponding thereto, so that upon actuation of said programming mechanism, successive VHF and selected UHF channels are tuned, seriatim, at successive ones of said indexing positions.

9. A tuner mechanism for a television receiver comprising:

a VHF tuner having a series of detented operating positions in each of which said receiver is conditioned for operation at a predetermined channel in the VHF band;

an UHF tuner comprising a stator assembly, a displaceable carriage, carriage indexing means, and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band, each said frequency selector being independent of the other said selectors so as to constitute, upon presentation to said stator assembly, a detented operating position in which said receiver is conditioned for operation at the desired UHF channel assigned thereto, and the number of said UHF operating positions being independent of the number of said VHF operating positions;

a programming mechanism having two separate series of indexing positions corresponding in number to said operating positions of said VHF and UHF tuners, respectively;

one index device included in said programming mechanism for each indexing position thereof and comprising a movable element displaceable from a first position to a second position;

drive means for actuating said programming mechanism is discrete steps throughout its said indexing positions;

a sensing device for sensing the position of each movable element of each said index device and coupled to said drive means to arrest operation thereof only upon sensing that any such movable element is in its aforesaid first position;

means for actuating said VHF tuner through its said operating positions in synchronism with and only during the actuation of said programming mechanism through one of said series of indexing positions and for actuating said UHF tuner through its said operating positions in synchronism with and only during the actuation of said programming mechanism through the other of said series of other indexing positions, whereupon actuation of said programming drive means, successive VHF and selected UHF channels are tuned, seriatim, at successive ones of said indexing positions;

and means for rendering said VHF tuner effective for channel selection during one and for rendering said UHF tuner effective for channel selection during the other of said two series of indexing positions.

10. A tuner mechanism in accordance with claim 3 in which said two series of indexing positions of said programming mechanism are interleaved.

11. A tuner mechanism in accordance with claim 1 in which said drive means concurrently actuates said programming mechanism and said VHF and said UHF tuners through their said indexing and operating positions, respectively.

12. A tuner mechanism in accordance with claim 1 comprising a drive shaft coupled to said drive means and supporting said VHF tuner, said UHF tuner and said programming mechanism in tandem.

13. A tuner mechanism in accordance with claim 1 comprising means for supporting said VHF tuner, said UHF tuner and said programming mechanism for concurrent actuation and for storing one of said VHF and UHF tuners intermediate its said channel selecting operating positions while the other of said tuners occupies one of its said channel selecting operating positions.

14. A tuner mechanism for a television receiver comprising:

a VHF tuner having a series of detented operating positions in each of which said receiver is conditioned for operation at a predetermined channel in the VHF band;

an UHF tuner comprising a stator assembly, a displaceable carriage, carriage indexing means, and a plurality of adjustable frequency selectors supported upon said carriage for alternative presentation to said stator assembly upon arrest of said carriage by said indexing means, each of said adjustable frequency selectors being individually, independently and semi-permanently tunable to select any of all of the channels of the UHF band, each said frequency selector being independent of the other said selectors so as to constitute, upon presentation to said stator assembly, a detented operating position in which said receiver is conditioned for operation at the desired UHF channel assigned thereto, and the number of said UHF operating positions being independent of the number of said VHF operating positions;

a programming mechanism having a programming cycle defined by two separate series of indexing positions each corresponding in number to said operating positions of said VHF and UHF tuners, respectively;

drive means for actuating said programming mechanism in discrete steps through its said two series of indexing positions during said programming cycle;

means for sequentially actuating said VHF and said UHF tuners through their said operating positions during said programming cycle and in synchronism with the actuation of said programming mechanism through its said two series of indexing positions, respectively, so that upon actuation of said programming drive means, successive VHF and selected UHF channels are tuned, seriatim, at successive ones of said indexing positions;

and means for rendering said VHF tuner effective for channel selection during that portion of the programming cycle corresponding to one of said series of indexing positions and for rendering said UHF tuner effective for channel selection during that portion of said programming cycle corresponding to the other of said series of indexing positions.

15. A tuner mechanism in accordance with claim 8 comprising a VHF stator contact assembly positioned for registration with said VHF strips, in seriatim, and establishing said VHF tuner as an intermediate frequency amplifier in the absence of one of said tuning strips.

References Cited by the Examiner

UNITED STATES PATENTS

| | | | |
|---|---|---|---|
| 2,772,353 | 11/1956 | Browder | 334—2 X |
| 2,773,986 | 12/1956 | Thias | 334—50 |
| 2,798,954 | 7/1957 | Gossard | 334—51 |
| 2,832,890 | 4/1958 | Thias | 325—461 |
| 2,873,610 | 2/1959 | Williams | 334—1 X |
| 2,908,814 | 10/1959 | Bell | 325—461 X |
| 2,964,623 | 12/1960 | Bell | 334—2 X |
| 3,069,638 | 12/1962 | Lindeman | 334—51 |
| 3,070,736 | 12/1962 | Polley | 318—16 X |
| 3,083,339 | 3/1963 | Bell | 334—50 X |
| 3,179,907 | 4/1965 | Brandt et al. | 334—1 |

ELI LIEBERMAN, *Acting Primary Examiner.*

HERMAN KARL SAALBACH, *Examiner.*